United States Patent [19]

Mitsch

[11] Patent Number: 5,689,893
[45] Date of Patent: Nov. 25, 1997

[54] DESICCANT CANISTER WITH POSITIONING BORE

[75] Inventor: Matthew D. Mitsch, Pittsburgh, Pa.

[73] Assignee: Westinghouse Air Brake Company, Wilmerding, Pa.

[21] Appl. No.: 713,471

[22] Filed: Sep. 13, 1996

[51] Int. Cl.⁶ ............................................. F26B 21/06
[52] U.S. Cl. ............................................. 34/80; 96/137
[58] Field of Search .................. 34/527, 540, 548, 34/562, 582, 79, 80, 82, 81, 95; 96/133, 136, 137

[56] References Cited

U.S. PATENT DOCUMENTS

| | | | |
|---|---|---|---|
| 3,092,477 | 6/1963 | Per-Oskar Persson | 34/80 |
| 3,434,599 | 3/1969 | Wischmeyer et al. | 96/137 X |
| 4,364,756 | 12/1982 | Clarke et al. | 96/137 |
| 4,653,199 | 3/1987 | McLeod | 34/80 |
| 4,816,047 | 3/1989 | Neal | 55/316 |
| 5,301,439 | 4/1994 | Wang | 96/125 |

Primary Examiner—John M. Sollecito
Assistant Examiner—Steve Gravini
Attorney, Agent, or Firm—James Ray & Associates

[57] ABSTRACT

A desiccant canister assembly for use in an air dryer system includes a pair of concentrically disposed casings, top and bottom end caps, top and bottom porous plates and moisture absorbing material. A cylindrical opening is defined in between the casings. The top end cap affixes to the upper ends of the casings. The bottom end cap affixes to the lower ends of the casings. Each end cap features openings that allow air to flow through the cylindrical opening. The bottom porous plate is situated at a bottom of the cylindrical opening against the bottom cap. The top porous plate is slidably disposed within the cylindrical opening near the upper ends of the casings. The absorbing material is disposed within the cylindrical opening between the porous plates. The desiccant assembly also includes a mechanism for compacting the absorbing material between the porous plates. The desiccant assembly further includes a mechanism for aligning and securably retaining the desiccant canister assembly within a canister housing of the air dryer system. The latter mechanism includes a positioning bore defined within an inner one of the casings and through a center of each end cap. The positioning bore receives a threaded rod extending from a center of an upper base of the housing about which the desiccant assembly securably retains through a lock washer and a stop nut so that an outer ring portion of the top cap aligns with and seals via an o-ring against a sealing flange of the housing.

17 Claims, 4 Drawing Sheets

DESICCANT CANISTER WITH POSITIONING BORE

CROSS-REFERENCE TO RELATED APPLICATIONS

This application is related to copending applications Ser. No. 08/713,782, and 08/710,207, entitled, Regenerative Desiccant Air Dryer, and Molded Rubber Valve Seal For Use In Predetermined Type Valves Such As A Check Valve In A Regenerative Air Dryer, respectively, all sharing the same filing date of the present application, Sep. 13, 1996. These patent applications are assigned to the assignee of the present invention, and their teachings are incorporated into the present document by reference.

FIELD OF THE INVENTION

The present invention generally relates to an air drying element for use in a compressed air system. More particularly, the present invention pertains to a desiccant canister assembly which includes a mechanism for aligning and securably retaining the desiccant canister assembly within a desiccant canister assembly housing of an air dryer system.

BACKGROUND OF THE INVENTION

It is well known that air dryer systems are designed to remove moisture vapor from a stream of compressed air into which the air dryer system is incorporated. In practice, an air dryer system employs one or more standard air drying assemblies each of which contains a moisture absorbing material to absorb the moisture from the air. In air dryer systems having one air drying assembly, the air drying assembly through its moisture absorbing material absorbs the moisture suspended in the compressed air passing through it until the compressor stops operating after a preset time. By design, this type of air dryer system then automatically flushes a quantity of the dried compressed air stored in a purge volume back through the moisture absorbing material to draw out the absorbed moisture. The stream of compressed air with the revaporized moisture it carries is then discharged to the atmosphere thereby regenerating the moisture absorbing material contained in the air drying assembly.

In air dryer systems having two air drying assemblies, the air drying system alternately cycles between removing moisture from air passing through a first drying assembly while purging from a second drying assembly moisture previously collected therein and removing moisture from air passing through the second drying assembly while purging from the first drying assembly moisture previously collected therein.

Prior to the present invention, such prior art air dryer systems generally have used the standard air drying assembly to perform the air drying function. Whether the air dryer system employs one or more standard air drying assemblies, each standard air drying assembly inserts into a housing designed to hold same. The prior art housings, however, generally retain the standard air drying assembly through a tight press fitting, or in other terms, interference fitting of the assembly within the housing. Specifically, the fit of the standard air drying assembly into its corresponding housing in the air dryer system is so tight that it typically must be hammered into the housing with a mallet or like instrument.

The standard air drying assembly and corresponding housing design thus present a number of shortcomings. First, the process of installing the standard air drying assembly into the housing is quite strenuous and takes too much time. Second, one cannot be sure whether the standard air drying assembly is properly aligned within the housing so that the top of the assembly seats against and makes an air tight seal with a sealing face of the housing. Third, removal of the standard air drying assembly from the housing is often quite difficult because of its tight fit within the housing. For these reasons, a novel air drying assembly that does not exhibit the disadvantages of the prior art standard air drying assembly would be very well received in the field of pneumatics. Accordingly, such a novel air drying assembly as alluded to above is described and claimed herein as follows.

It should be noted that the foregoing background information is provided to assist the reader in understanding the instant invention. Accordingly, any terms of art used herein are not intended to be limited to any particular narrow interpretation unless specifically stated otherwise in this document.

SUMMARY OF THE INVENTION

In a presently preferred embodiment, the present invention provides a desiccant canister assembly for use in an air dryer system. The desiccant canister assembly includes a pair of concentrically disposed casings, top and bottom end caps, top and bottom porous plates and moisture absorbing material. A cylindrical opening is defined in between the casings. The top cap affixes to the upper ends of the casings. The bottom cap affixes to the lower ends of the casings. Each end cap features openings that allow air to flow through the cylindrical opening. The bottom porous plate is situated at a bottom of the cylindrical opening against the bottom cap. The top porous plate is slidably disposed within the cylindrical opening near the upper ends of the casings. The moisture absorbing material is disposed within the cylindrical opening between the top and bottom porous plates. The desiccant canister assembly also includes a mechanism for compacting the moisture absorbing material between the porous plates. The desiccant canister assembly further includes a mechanism for aligning and securably retaining the desiccant canister assembly within a canister housing of the air dryer system. The latter mechanism includes a positioning bore defined within an inner one of the casings and through a center of each end cap. The positioning bore receives a threaded rod extending from a center of an upper base of the housing about which the desiccant assembly securably retains with a securing device so that an o-ringed outer ring portion of the top cap aligns with and seals against a sealing flange of the canister housing.

OBJECTS OF THE INVENTION

It is, therefore, one of the primary objects of the present invention to provide a novel desiccant canister assembly for use in an air dryer system.

Another object of the present invention is to provide a novel desiccant canister assembly inclusive of a mechanism for aligning and securably retaining the desiccant canister assembly within a corresponding housing of an air dryer system.

Yet another object of the present invention is to provide a novel desiccant canister assembly that features a positioning bore through its center through which inserts a threaded rod of a housing for the canister assembly so as to retain the canister assembly about the threaded rod with a securing mechanism so that a top of the canister assembly aligns with and seals against a sealing flange of the housing.

Still another object of the present invention is to provide a novel desiccant canister assembly that features a positioning bore through its center through which inserts a threaded rod of a housing for the canister assembly so as to retain the canister assembly about the threaded rod with a lock washer and a stop nut so that an o-ringed outer ring portion of a top of the canister assembly aligns with and seals against a sealing flange of the housing.

Even another object of the present invention is to provide a novel desiccant canister assembly which installs within a corresponding housing of an air dryer system far easier than prior art desiccant canisters.

In addition to the objects and advantages of the desiccant canister assembly set forth above, various other objects and advantages will become more readily apparent to persons skilled in the air dryer system art from a reading of the detailed description section of this document. Such other objects and advantages will become particularly apparent when the detailed description is considered in conjunction with the attached drawings and with the appended claims.

BRIEF DESCRIPTION OF THE DRAWINGS

FIG. 2c is an enlarged partial cross-sectional view of an o-ring groove within the outer ring portion shown in FIG. 2a.

DETAILED DESCRIPTION OF THE INVENTION

Figure 1:
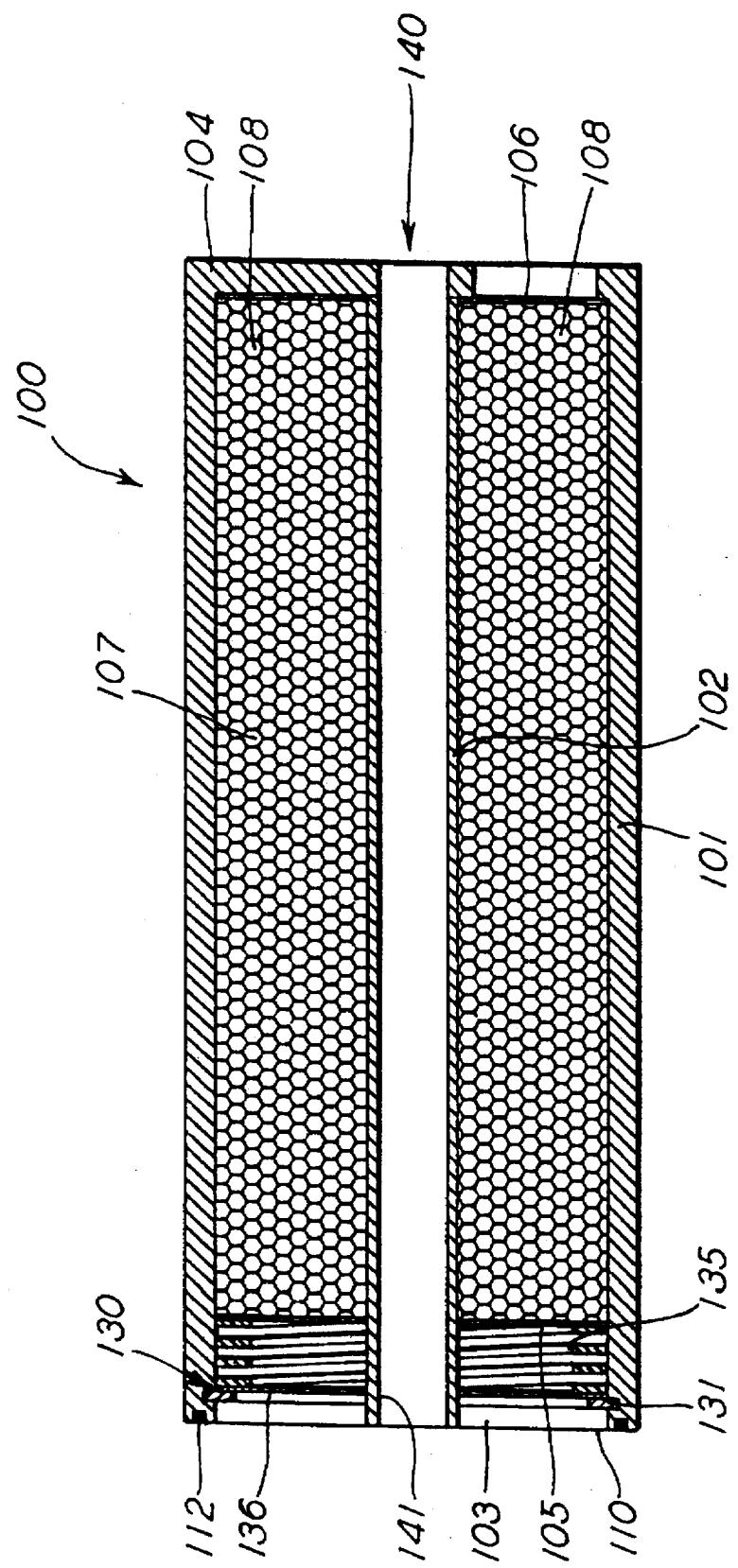
FIG. 1 is a cross-sectional view of a desiccant canister assembly according to the present invention.

Before describing the present invention in detail, for the sake of clarity and understanding, the reader is advised that identical components having identical functions in each of the accompanying drawings have been marked with the same reference numerals throughout each of the several Figures illustrated herein.

Figure 2:
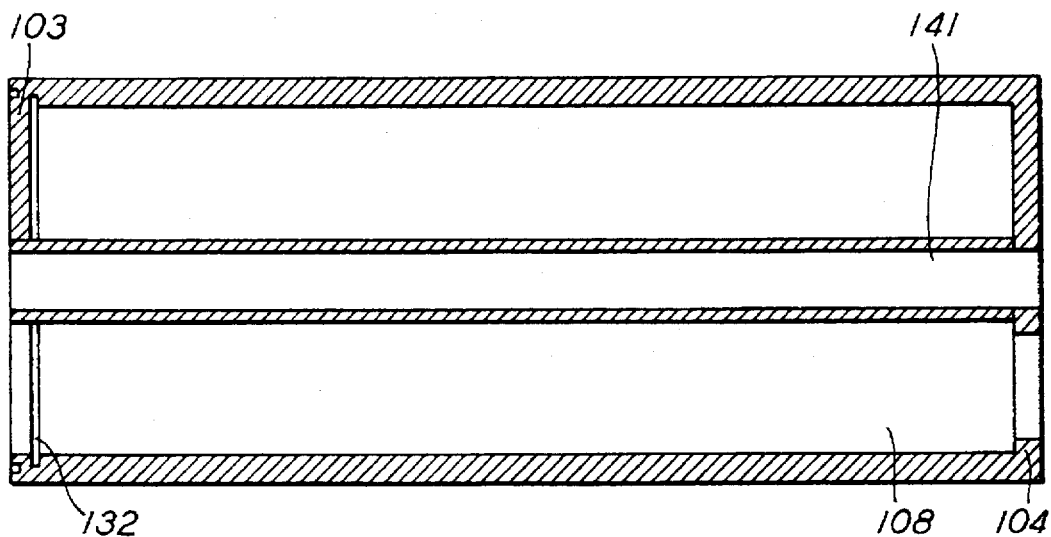
FIG. 2 is another cross-sectional view of a desiccant canister assembly according to the present invention.
Figure 3:
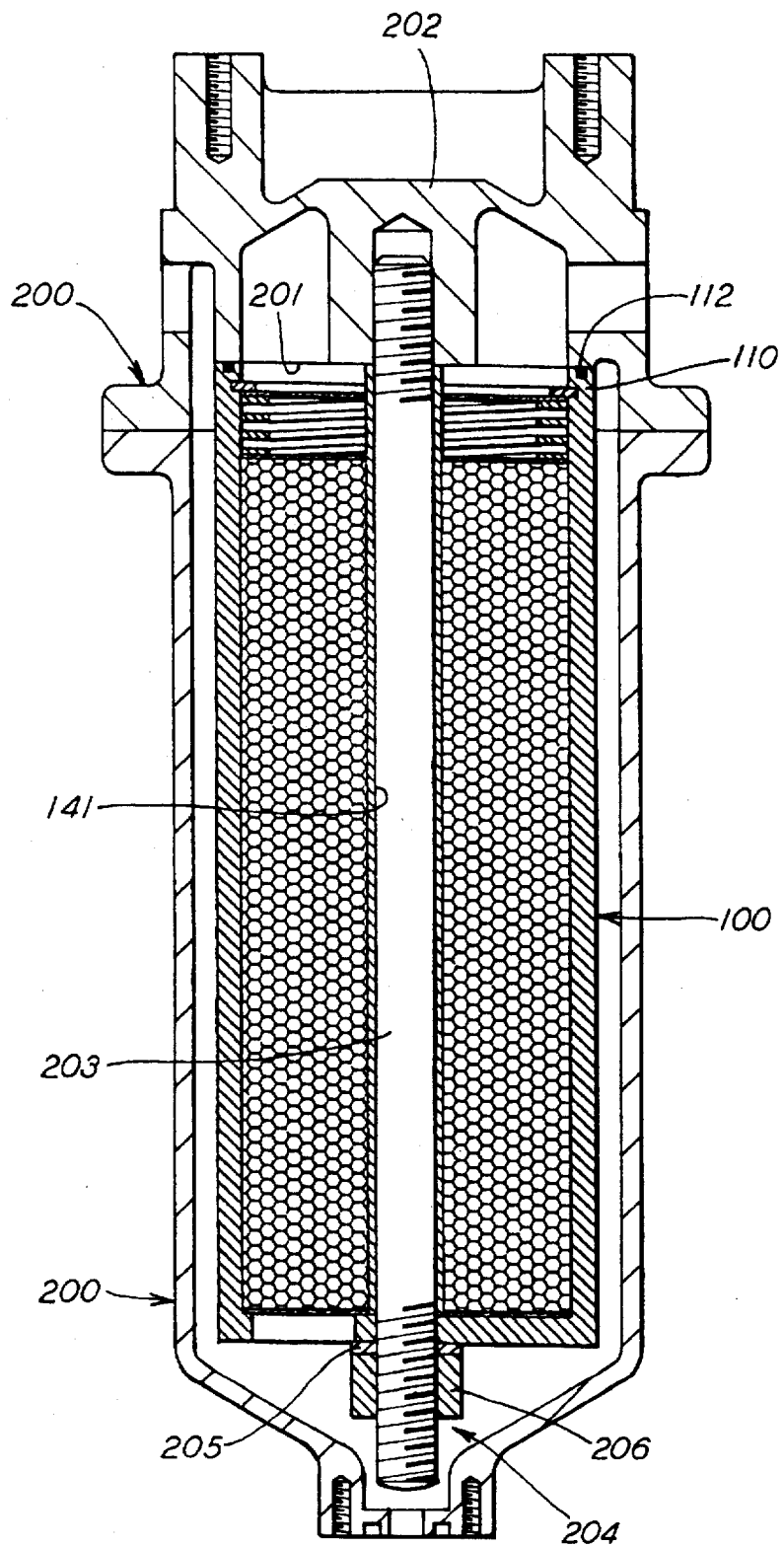
FIG. 3 is a cross-sectional view of a desiccant canister assembly according to the present invention contained within a corresponding canister housing of an air dryer system.
Figure 4:
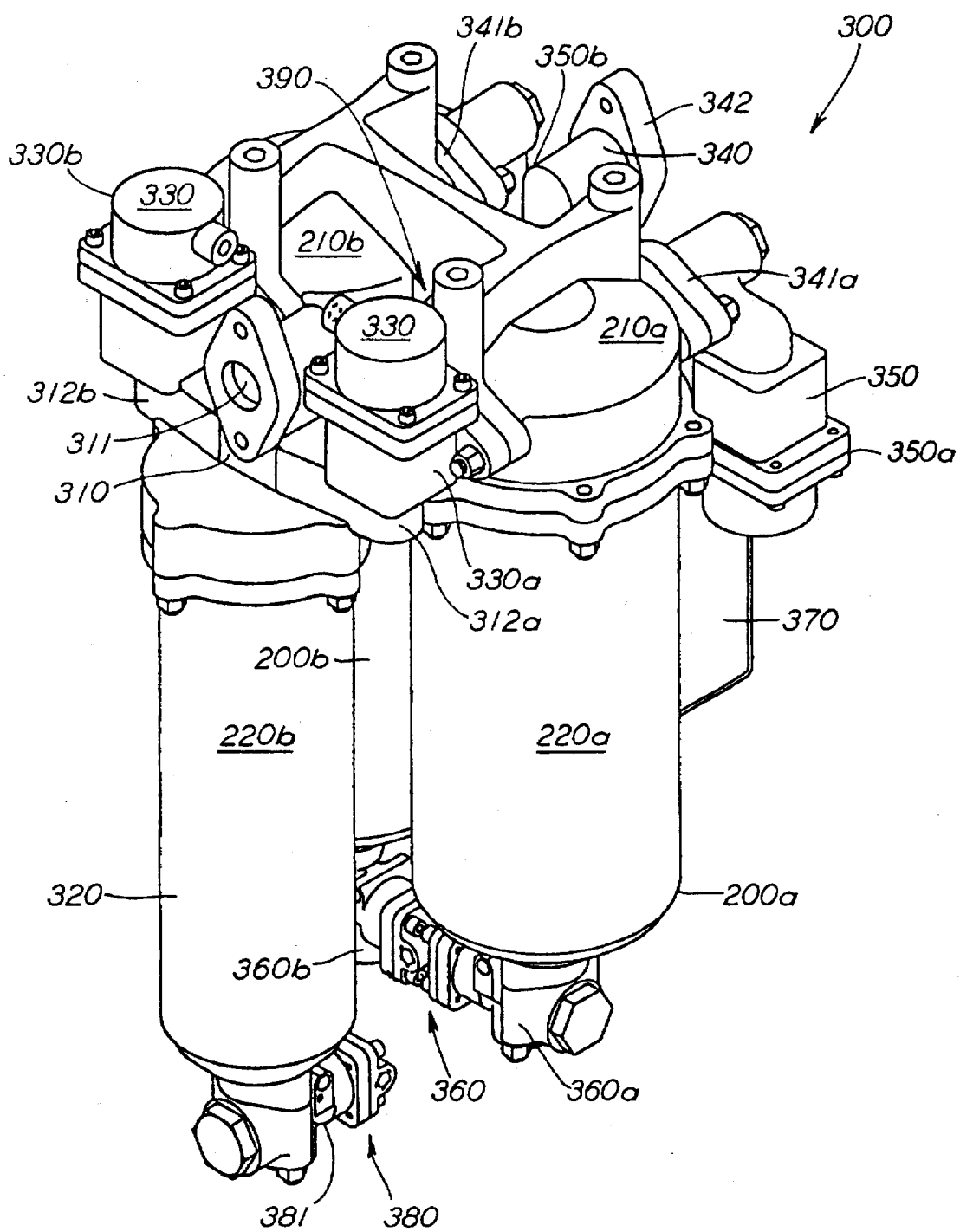
FIG. 4 is a perspective view of a regenerative air dryer system featuring two canister housings of the type shown in FIG. 3.

FIGS. 1 through 3 illustrate the essential details of a desiccant canister assembly for use in an air dryer system. The desiccant canister assembly may be used within a variety of air dryer systems bearing at least one canister housing having the basic structural characteristics shown in FIG. 3. FIG. 4 shows a regenerative air dryer system bearing two canister housings each having the basic structural characteristics shown in FIG. 3. It is within a canister housing having these basic structural characteristics that the desiccant canister assembly of the present invention is primarily designed to be retained. One such canister housing is featured in one of the aforementioned documents previously incorporated herein by reference.

Figure 2A:
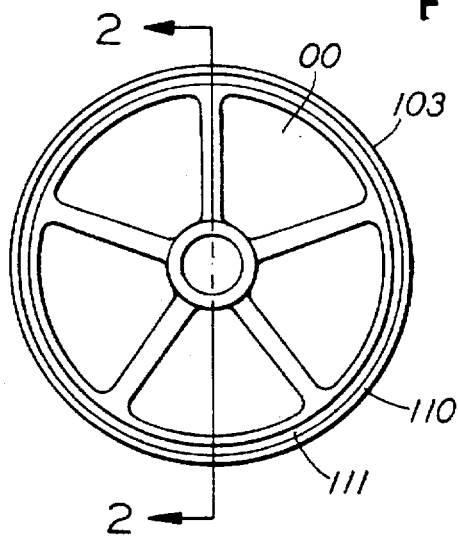
FIG. 2a is a top plan view of a top end cap of the desiccant canister assembly shown in FIGS. 1 and 2 illustrating an outer ring portion of the top end cap.
Figure 2B:
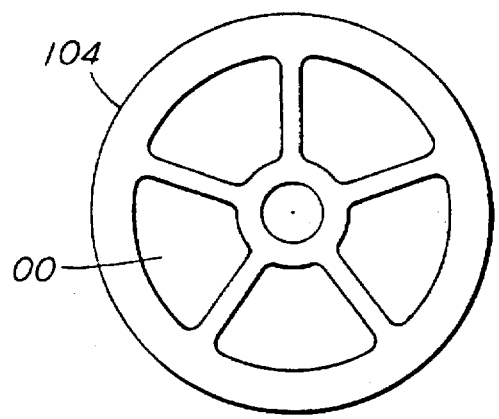
FIG. 2b is a bottom plan view of a bottom end cap of the desiccant canister assembly shown in FIGS. 1 and 2.
Figure 2D:
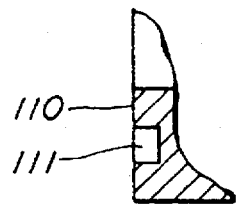
FIG. 2d is an enlarged partial cross-sectional view of a retaining ring groove within an outer casing of the desiccant canister assembly shown in FIGS. 1 and 2.
Figure 2C:
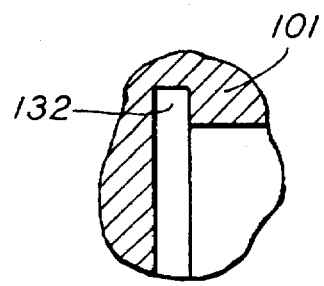

In a presently preferred embodiment, the desiccant canister assembly, generally designated 100, includes a pair of concentrically disposed casings 101 and 102, top and bottom end caps 103 and 104, top and bottom porous plates 105 and 106 and moisture absorbing material 107. The casings 101 and 102 each have an upper end and a lower end and are disposed to form a cylindrical opening 108 between them. Bottom end cap 104 affixes to the lower ends of casings 101 and 102. Likewise, top end cap 103 affixes to the upper ends of the casings. Preferably, top and bottom end caps 103 and 104 are affixed to the upper and lower ends of the casings, respectively, via a molding or melding operation. As shown in FIGS. 2a and 2b, the top and bottom end caps each have openings 00 which allow air to flow through the cylindrical opening 108. Top end cap 103 also features an outer ring portion 110. The outer ring portion 110 preferably includes a groove 111 within which an o-ring 112 retains as shown in FIG. 2c. Through o-ring 112, the outer ring portion 110 of top end cap 103 is seatable against, and capable of making an air tight seal with, a sealing flange 201 of a canister housing, generally designated 200, as shown in FIG. 3. Sealing flange 201 is found on an upper base, generally designated 202, of canister housing 200.

Referring again to FIGS. 1 and 3, bottom porous plate 106 is situated approximate a bottom of the cylindrical opening 108 against bottom end cap 104. Top porous plate 103 is slidably disposed within the cylindrical opening 108 near the upper ends of casings 101 and 102. The moisture absorbing material 107 is disposed within cylindrical opening 108 between top and bottom porous plates 105 and 106. The moisture absorbing material 107 may be selected from any one of several commercially available types such as a mesh white activated alumina desiccant. Preferably in pelletized form, the desiccant may consist of approximately three sixteenths of an inch (3/16") sized beads or spheres of the activated alumina desiccant.

The desiccant canister assembly 100 also includes a means, generally designated 130, for compacting the moisture absorbing material 107 between top and bottom porous plates 105 and 106. The compacting means 130 includes a retaining ring 131 and a spring 135. Retaining ring 131 affixes within cylindrical opening 108 to an outer one 101 of the casings approximate its upper end as is best shown in FIGS. 1 and 2d. Preferably, retaining ring 131 fixes within a groove 132 defined within outer casing 101 approximate the upper end of outer casing 101. Spring 135 is compressively situated between retaining ring 131 and top porous plate 105 so as to maintain a compressive force upon the moisture absorbing material 107 disposed in the cylindrical opening 108 between top and bottom porous plates 105 and 106. The compacting means 130 may also feature an uppermost porous plate 136 abutting an interior facing side of retaining ring 131 within cylindrical opening 108 so that uppermost plate 136 is sandwiched between retaining ring 131 and spring 135. Though situated between uppermost plate 136 and top plate 105, spring 135 still compresses the moisture absorbing material 107 between top and bottom porous plates 105 and 106. For desiccant canister assemblies so equipped, the uppermost porous plate 136 provides yet another barrier to prevent crumbled desiccant particulates from escaping into the air dryer system. Each of the porous plates 105, 106 and 136 have a plurality of apertures that allow flow of air while trapping such particulates. The dimensions of each of the apertures, of course, should be smaller than the desiccant pellets that may be used as the moisture absorbing material 107.

The desiccant canister assembly 100 also includes a means, generally designated 140, for aligning and securably retaining the desiccant canister assembly 100 within canister housing 200 of FIG. 3. As shown in FIGS. 1 through 3, the means for aligning and securably retaining 140 includes a positioning bore 141 defined within an inner one 102 of the casings and through a center of each of the end caps 103 and 104. The positioning bore 141 receives a threaded rod 203 as shown in FIG. 3. The threaded rod 203 extends from a center of an upper base 202 of canister housing 200. The desiccant canister assembly 100 securably retains about threaded rod 203 via a securing means 204 such as a lock washer 205 and a stop nut 206. It is through this means for aligning and securably retaining 140 that outer ring portion 110 of top end cap 103 aligns with and seals via said o-ring 112 against sealing flange 201 of canister housing 200.

While the presently preferred embodiment for carrying out the desiccant canister assembly invention has been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit any of the following claims to any particular narrow interpretation.

Accordingly, to promote the progress of science and useful arts, I secure for myself by Letters Patent exclusive rights to all subject matter embraced by the following claims for the time prescribed by the Patent Act.

I claim:

1. A desiccant canister assembly for use in a gas dryer system, said desiccant canister assembly comprising:
   (a) a pair of concentrically disposed casings, each having an upper end and a lower end, such that a cylindrical opening is defined between said casings;
   (b) a pair of end caps a bottom of which affixed to said lower ends of said pair of casings and a top of which affixed to said upper ends of said pair of casings, each of said end caps defining openings therein for allowing flow of gas through said cylindrical opening;
   (c) a bottom porous plate situated approximate a bottom of said cylindrical opening against said bottom end cap;
   (d) a top porous plate slidably disposed within said cylindrical opening near said upper ends of said casings;
   (e) a moisture absorbing material disposed within said cylindrical opening between said top and said bottom porous plates;
   (f) a retaining ring affixed within said cylindrical opening to one of said casings approximate said upper end thereof;
   (g) a spring compressively situated between said retaining ring and said top porous plate so as to maintain a compressive force upon said moisture absorbing material disposed between said top and said bottom porous plates; and
   (h) a means for aligning and securably retaining said desiccant canister assembly within a desiccant canister assembly housing of said gas dryer system.

2. The desiccant canister assembly as recited in claim 1 wherein said means for aligning and securably retaining includes a positioning bore defined within an inner one of said casings and through a center of each of said end caps, said positioning bore for receiving a threaded rod extending from a center of an upper base of said housing about which said desiccant canister assembly aligns and securably retains via a lock washer and a stop nut.

3. The desiccant canister assembly as recited in claim 1 further comprising an o-ring retained within a groove defined within an outer ring portion of said top end cap for sealing said desiccant canister assembly against a sealing flange of said housing.

4. The desiccant canister assembly as recited in claim 3 wherein said means for aligning and securably retaining includes a positioning bore defined within an inner one of said casings and through a center of each of said end caps, said positioning bore for receiving a threaded rod extending from a center of an upper base of said housing about which said desiccant canister assembly retains via a lock washer and a stop nut so that said outer ring portion of said top end cap aligns with and seals via said o-ring against said sealing flange of said housing.

5. The desiccant canister assembly as recited in claim 1 wherein said retaining ring affixes within a groove defined within an outer one of said casings approximate said upper end thereof.

6. The desiccant canister assembly as recited in claim 1 wherein said top and said bottom porous plates each have a plurality of small apertures for allowing flow of gas therethrough.

7. The desiccant canister assembly as recited in claim 1 wherein said top and bottom end caps are affixed to said upper and said lower ends of said casings, respectively, via one of a molding operation and melding operation.

8. A desiccant canister assembly for use in a gas dryer system, said desiccant canister assembly comprising:
   (a) a pair of concentrically disposed casings, each having an upper end and a lower end, such that a cylindrical opening is defined between said casings;
   (b) a pair of end caps a bottom of which affixed to said lower ends of said pair of casings and a top of which affixed to said upper ends of said pair of casings, each of said end caps defining openings therein for allowing flow of gas through said cylindrical opening;
   (c) a bottom porous plate situated approximate a bottom of said cylindrical opening against said bottom end cap;
   (d) a top porous plate slidably disposed within said cylindrical opening near said upper ends of said casings;
   (e) a moisture absorbing material disposed within said cylindrical opening between said top and said bottom porous plates;
   (f) a means for compacting said moisture absorbing material between said top and said bottom porous plates; and
   (g) a means for aligning and securably retaining said desiccant canister assembly within a desiccant canister assembly housing of said gas dryer system.

9. The desiccant canister assembly as recited in claim 8 wherein said means for aligning and securably retaining includes a positioning bore defined within an inner one of said casings and through a center of each of said end caps, said positioning bore for receiving a threaded rod extending from a center of an upper base of said housing about which said desiccant canister assembly securably retains via a lock washer and a stop nut.

10. The desiccant canister assembly as recited in claim 8 further comprising an o-ring retained within a groove defined within an outer ring portion of said top end cap for sealing said desiccant canister assembly against a sealing flange of said housing.

11. The desiccant canister assembly as recited in claim 10 wherein said means for aligning and securably retaining includes a positioning bore defined within an inner one of said casings and through a center of each of said end caps, said positioning bore for receiving a threaded rod extending from a center of an upper base of said housing about which said desiccant canister assembly retains via a lock washer and a stop nut so that said outer ring portion of said top end cap aligns with and seals via said o-ring against said sealing flange of said housing.

12. The desiccant canister assembly as recited in claim 8 wherein said means for compacting said moisture absorbing material includes:

(a) a retaining ring affixed within said cylindrical opening to an outer one of said casings approximate said upper end thereof; and (b) a spring compressively situated between said retaining ring and said top porous plate so as to maintain a compressive force upon said moisture absorbing material disposed in said cylindrical opening between said top and said bottom porous plates.

13. The desiccant canister assembly as recited in claim 12 wherein said retaining ring affixes within a groove defined within said outer casing approximate said upper end thereof.

14. The desiccant canister assembly as recited in claim 8 wherein said means for compacting said moisture absorbing material includes:

(a) a retaining ring affixed within said cylindrical opening to an outer one of said casings approximate said upper end thereof;

(b) an uppermost porous plate abutting an interior facing side of said retaining ring within said cylindrical opening; and (c) a spring compressively situated between said uppermost and said top porous plates so as to maintain a compressive force upon said moisture absorbing material disposed in said cylindrical opening between said top and said bottom porous plates.

15. The desiccant canister assembly as recited in claim 14 wherein said retaining ring affixes within a groove defined within said outer casing approximate said upper end thereof.

16. The desiccant canister assembly as recited in claim 14 wherein said porous plates each have a plurality of small apertures for allowing flow of gas therethrough.

17. The desiccant canister assembly as recited in claim 8 wherein said top and bottom end caps are affixed to said upper and said lower ends of said casings, respectively, via one of a molding operation and melding operation.

\* \* \* \* \*